United States Patent
Saito

(10) Patent No.: US 11,137,964 B2
(45) Date of Patent: Oct. 5, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yasushi Saito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/845,684

(22) Filed: Apr. 10, 2020

(65) Prior Publication Data

US 2021/0191668 A1    Jun. 24, 2021

(30) Foreign Application Priority Data

Dec. 24, 2019 (JP) .............................. JP2019-233148

(51) Int. Cl.
*G06F 3/12* (2006.01)
*G06F 16/16* (2019.01)

(52) U.S. Cl.
CPC ............ *G06F 3/127* (2013.01); *G06F 3/1204* (2013.01); *G06F 3/1287* (2013.01); *G06F 16/16* (2019.01)

(58) Field of Classification Search
CPC ........ G06F 3/127; G06F 3/1287; G06F 16/16; G06F 3/1204
See application file for complete search history.

(56) References Cited

U.S. PATENT DOCUMENTS

| | | | | |
|---|---|---|---|---|
| 8,681,354 B2* | 3/2014 | Matsuzaki | ............ | G06F 3/1229 358/1.15 |
| 8,913,279 B2* | 12/2014 | Kise | ...................... | G06F 3/1285 358/1.15 |
| 8,995,001 B1* | 3/2015 | Koets | ..................... | G06F 3/1288 358/1.15 |
| 9,396,208 B2 | 7/2016 | Fukui et al. | | |
| 9,396,209 B2 | 7/2016 | Fukui et al. | | |
| 2005/0073717 A1* | 4/2005 | Arakawa | ................. | G06F 3/127 358/1.15 |
| 2007/0005561 A1* | 1/2007 | Sakura | ................... | G06F 3/1205 |
| 2007/0061377 A1* | 3/2007 | Tani | ........................ | G06F 16/93 |
| 2007/0086038 A1* | 4/2007 | Matsuzaki | ............ | G06F 3/1208 358/1.13 |
| 2009/0273799 A1* | 11/2009 | Hanawa | ................ | G06F 3/1204 358/1.9 |
| 2010/0225963 A1* | 9/2010 | Kuroshima | ........... | G06F 3/1253 358/1.15 |

(Continued)

FOREIGN PATENT DOCUMENTS

JP            4732113 B2      7/2011
JP        2013-228873 A      11/2013
(Continued)

*Primary Examiner* — Ted W Barnes
(74) *Attorney, Agent, or Firm* — Oliff PLC

(57) ABSTRACT

An information processing apparatus includes at least one processor. The processor is configured to create, under a first folder associated with a cloud system used by the information processing apparatus, a second folder set to perform operations provided by the cloud system, and is configured to perform control to perform the operations provided by the cloud system set in the second folder if a document is registered in the second folder.

7 Claims, 14 Drawing Sheets

(56) References Cited

U.S. PATENT DOCUMENTS

| | | | | |
|---|---|---|---|---|
| 2012/0133981 A1* | 5/2012 | Kise | ................... | G06F 3/1207 |
| | | | | 358/1.15 |
| 2012/0182580 A1* | 7/2012 | Yamashita | ............ | G06F 3/1288 |
| | | | | 358/1.16 |
| 2013/0286431 A1* | 10/2013 | Kise | ................... | G06F 3/1285 |
| | | | | 358/1.15 |
| 2013/0326568 A1* | 12/2013 | Tanaka | ............. | H04N 21/26613 |
| | | | | 725/82 |
| 2014/0006350 A1* | 1/2014 | Fukui | ................... | G06F 16/178 |
| | | | | 707/632 |
| 2015/0095988 A1* | 4/2015 | Hirakata | ................ | H04L 63/08 |
| | | | | 726/4 |
| 2016/0266851 A1* | 9/2016 | Kanamoto | ............ | G06F 3/1228 |
| 2017/0090839 A1* | 3/2017 | Bilan | ................... | G06F 3/1274 |
| 2018/0189369 A1* | 7/2018 | Baek | ................... | G06F 16/27 |
| 2019/0369930 A1* | 12/2019 | Iida | ................... | G06F 3/1288 |
| 2020/0034087 A1* | 1/2020 | Iida | ................... | G06F 3/1228 |
| 2020/0034090 A1* | 1/2020 | Iida | ................... | G06F 3/1238 |
| 2020/0042260 A1* | 2/2020 | Kanamoto | ............ | G06F 3/1253 |
| 2020/0272394 A1* | 8/2020 | Kubota | ................ | G06F 3/1285 |

FOREIGN PATENT DOCUMENTS

| | | | | | |
|---|---|---|---|---|---|
| JP | 2014-002688 | A | | 1/2014 | |
| JP | 2014-010465 | A | | 1/2014 | |
| JP | 2014002688 | A | * | 1/2014 | |
| JP | 6421200 | B2 | | 11/2018 | |
| WO | 2016/103422 | A1 | | 6/2016 | |
| WO | WO-2016103422 | A1 | * | 6/2016 | ......... H04L 41/0859 |

\* cited by examiner

FIG. 6

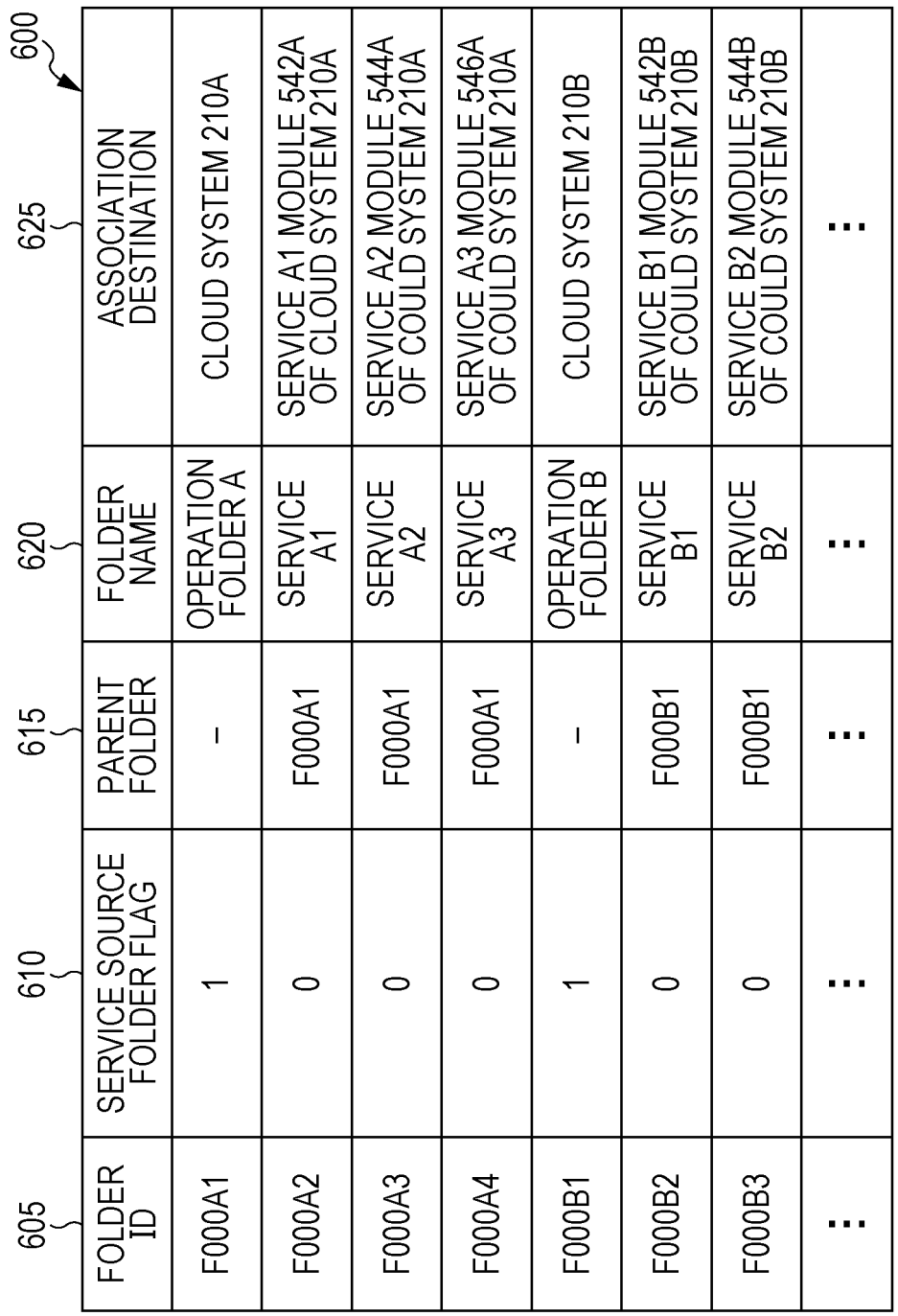

| FOLDER ID 605 | SERVICE SOURCE FOLDER FLAG 610 | PARENT FOLDER 615 | FOLDER NAME 620 | ASSOCIATION DESTINATION 625 |
|---|---|---|---|---|
| F000A1 | 1 | – | OPERATION FOLDER A | CLOUD SYSTEM 210A |
| F000A2 | 0 | F000A1 | SERVICE A1 | SERVICE A1 MODULE 542A OF CLOUD SYSTEM 210A |
| F000A3 | 0 | F000A1 | SERVICE A2 | SERVICE A2 MODULE 544A OF COULD SYSTEM 210A |
| F000A4 | 0 | F000A1 | SERVICE A3 | SERVICE A3 MODULE 546A OF COULD SYSTEM 210A |
| F000B1 | 1 | – | OPERATION FOLDER B | CLOUD SYSTEM 210B |
| F000B2 | 0 | F000B1 | SERVICE B1 | SERVICE B1 MODULE 542B OF COULD SYSTEM 210B |
| F000B3 | 0 | F000B1 | SERVICE B2 | SERVICE B2 MODULE 544B OF COULD SYSTEM 210B |
| ... | ... | ... | ... | ... |

FIG. 8

| FOLDER ID 805 | SERVICE SOURCE FOLDER FLAG 810 | PARENT FOLDER 815 | FOLDER NAME 820 | ASSOCIATION DESTINATION 825 | RECEPTION RESTRICTION 830 |
|---|---|---|---|---|---|
| F000A1 | 1 | – | OPERATION FOLDER A | CLOUD SYSTEM 210A | – |
| F000A2 | 0 | F000A1 | SERVICE A1 | SERVICE A1 MODULE 542A OF CLOUD SYSTEM 210A | DOCUMENT OF IMAGE RECEIVED FROM IMAGE PROCESSING APPARATUS 220 |
| F000A3 | 0 | F000A1 | SERVICE A2 | SERVICE A2 MODULE 544A OF COULD SYSTEM 210A | – |
| F000A4 | 0 | F000A1 | SERVICE A3 | SERVICE A3 MODULE 546A OF COULD SYSTEM 210A | – |
| F000B1 | 1 | – | OPERATION FOLDER B | CLOUD SYSTEM 210B | – |
| F000B2 | 0 | F000B1 | SERVICE B1 | SERVICE B1 MODULE 542B OF COULD SYSTEM 210B | – |
| F000B3 | 0 | F000B1 | SERVICE B2 | SERVICE B2 MODULE 544B OF COULD SYSTEM 210B | – |
| ... | ... | ... | ... | ... | ... |

800

FIG. 9
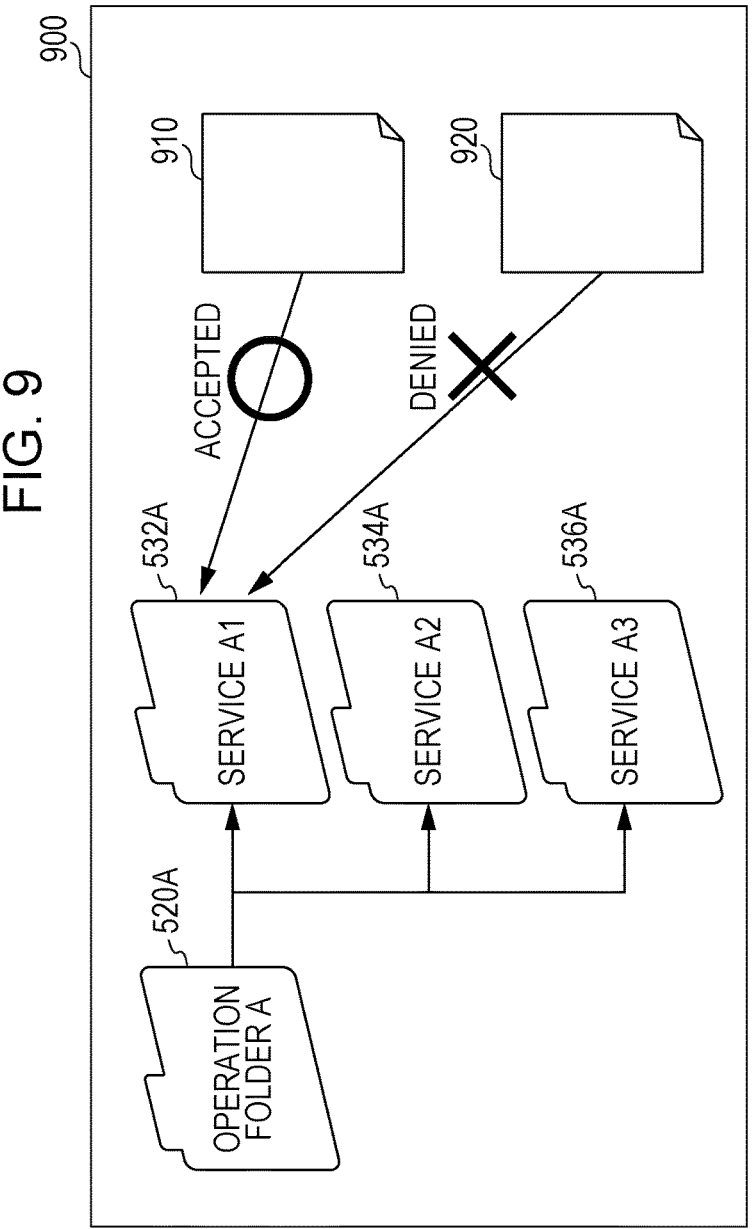
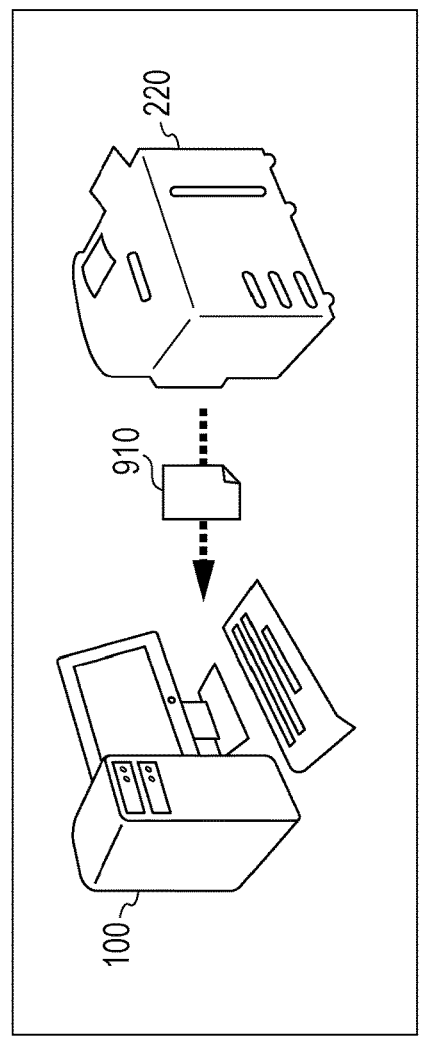

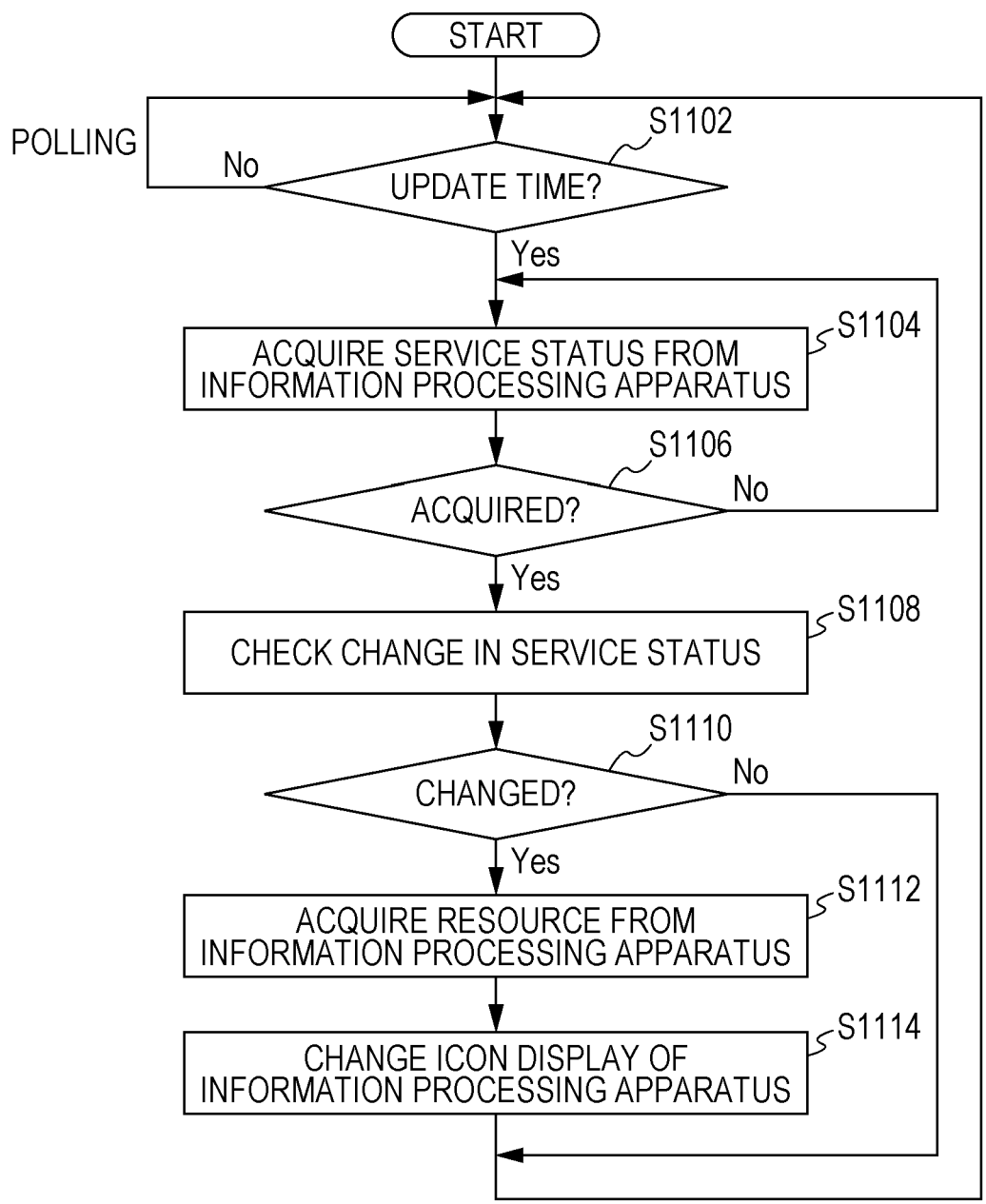

FIG. 14A
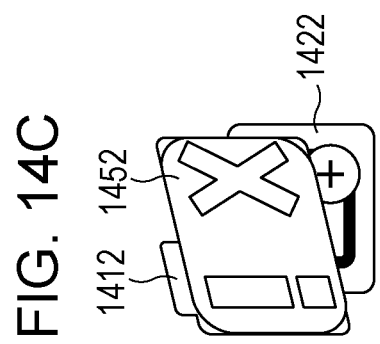
FIG. 14B1
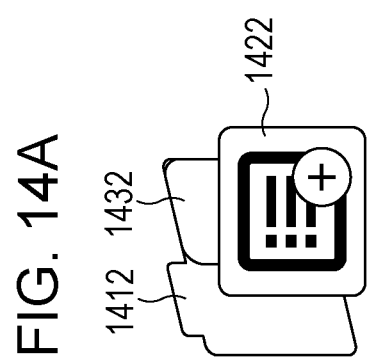
FIG. 14B2
FIG. 14C
CONTRACT ATTRIBUTE ADDITION SERVICE IS NOT AVAILABLE — 1442

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-233148 filed Dec. 24, 2019.

BACKGROUND (i) Technical Field

The present disclosure relates to an information processing apparatus and a non-transitory computer readable medium.

(ii) Related Art

Japanese Unexamined Patent Application Publication No. 2014-002688 discloses an information processing apparatus that addresses the problem that a user erroneously inputs an unprintable job onto an icon of a folder related to a printer displayed on a user interface (UI) screen. If a drag operation causes job data to be displayed in overlay on the folder, the information processing apparatus determines, in accordance with information on the folder and the job data, whether the job data is eligible to enter the folder. If the information processing apparatus determines that the job data is not eligible to enter the folder, the information processing apparatus performs control to set the folder to be in a data reception inhibit state.

Japanese Unexamined Patent Application Publication No. 2013-228873 discloses a display that may facilitate finding easily a difference between settings of multiple hot folders and a hot folder having a desired setting among the hot folders and may also reduce time to register multiple hot folders corresponding to a combination of settings. The display includes a configuration unit that configures a configuration tree denoted by a tree structure by defining a parent-child relationship of multiple job setting values, a creation unit that creates multiple hot folders corresponding to a combination of job setting values forming each of configuration trees, and a display that displays hot folders, corresponding to a combination of selectable job setting values at a specified layer of each of the configuration trees, from among the hot folders created by the creation unit.

Japanese Patent No. 4732113 discloses an information processing apparatus that supports a flexible operation (such as adding or modifying a setting or removing a device) in response to a change in the status of the device. Such an operation is not supported in hot-folder technique or driver technique of the related art. The information processing apparatus creates print data to be printed on a printer in response to input data in accordance with a set print attribute. The information processing apparatus includes a setting unit that sets a print attribute that is associated with a predetermined memory region, a detector unit that detects data input onto the memory region, a determination unit that, when the data inputting has been detected by the detector unit, determines whether the printer has changed in state since the time point of the print attribute set by the setting unit, a modification unit that modifies the print attribute set by the setting unit when the determination unit has determined that the printer has changed in state, and a transmitting unit. If the determination unit had determined that the printer has not changed in state, the transmitting unit transmits, to the printer, print data that is created by applying onto data input on the memory region the print attribute set by the setting unit and not being modified by the modification unit. If the determination unit has determined that the printer has changed in state, the transmitting unit transmits, to the printer, print data that is created by applying the print attribute modified by the modification unit onto data input on the memory region.

Japanese Unexamined Patent Application Publication No. 2014-010465 discloses a technique that enables each user to use multiple storage clouds in a safe manner and at no expense of operability. The technique selects, from the storage clouds connected to a cloud user terminal via a network, at least one storage cloud that is used to store an actual file that is storable on the cloud user terminal. According to the technique, when the actual file is created or stored on a virtual folder on the cloud user terminal, an attribute or context of the actual file or an attribute of the virtual folder, and each of the attributes of the storage clouds is referenced. From among the storage clouds, a single storage cloud used to store the actual file is selected in order to satisfy a predetermined rule.

Japanese Patent No. 6421200 discloses a cloud configuration storage system that is connected to at least one cloud service providing system that provides a cloud service. The could configuration storage system includes a client apparatus and a server.

The client apparatus includes a cloud connection information receiving unit that receives, from a user, cloud connection information to configure a cloud environment, a configuration storage processor that receives, from the user, cloud information used to store configuration information of the cloud environment and creates a storage request of the configuration information to the server, and a configuration log display processor that receives the cloud information used to display a configuration specified by the user and causes the configuration information of the cloud environment at any time point to be displayed as a configuration viewer.

The server includes a cloud connection information unit that stores and registers, on a cloud connection information database (DB), the cloud connection information received by the cloud connection information receiving unit in the client apparatus, a configuration information acquisition processor that acquires from the cloud service providing system the configuration information that the cloud service providing system has organized in response to a cloud configuration information acquisition request from the configuration storage processor in the client apparatus, a configuration log DB that stores the acquired configuration information as configuration log information, and a configuration log acquisition processor that acquires the configuration log information from the configuration log DB.

In the cloud configuration storage system, when the configuration storage processor receives an instruction to store the cloud configuration from the user, the configuration storage processor extracts a cloud identification (ID) to acquire the configuration information and transmits to the configuration information acquisition processor a configuration display request of the extracted cloud ID.

The configuration information acquisition processor acquires the cloud connection information from the cloud connection information DB in response to the cloud ID, identifies the cloud service providing system that acquires the configuration information from the acquired cloud connection information, acquires the configuration information from the identified cloud service providing system and stores the acquired configuration information onto the configuration log DB.

The configuration log display processor acquires a configuration log from the configuration log acquisition processor in accordance with the cloud information used to display a configuration and received from the user, creates a cloud configuration chart using a configuration element icon of each configuration element and connection information in accordance with the acquired configuration log, and displays the created cloud configuration chart on the screen of the configuration log display processor.

The configuration information acquisition processor includes a processing unit, a first cloud determination processing unit, a first configuration information acquisition processing unit, a second cloud determination processing unit, a second configuration information acquisition processing unit, and a third cloud determination processing unit.

The processing unit acquires in response to the cloud ID the cloud connection information from the cloud connection information DB that stores the cloud connection information.

The first cloud determination processing unit determines whether a cloud specified by a cloud service provider ID corresponding to the specified cloud ID is manufactured by a first company.

If the specified cloud is manufactured by the first company, the first configuration information acquisition processing unit, transmits an acquisition request for the configuration information to a first cloud service, acquires first configuration information from the first cloud service, and updates a log thereof.

If the specified cloud is not manufactured by the first company, the second cloud determination processing unit determines whether the cloud specified by the cloud service provider ID corresponding to the specified cloud ID is manufactured by a second company.

If the specified cloud is manufactured by the second company, the second configuration information acquisition processing unit transmits an acquisition request for second configuration information to a second cloud service, acquires the second configuration information from the second cloud service, and updates the log.

The third cloud determination processing unit determines whether the first and second configuration information of all the specified clouds has been acquired.

The configuration log display processor includes a processing unit that acquires a cloud ID, desired to be displayed, out of information input via an input unit by the user and a configuration log ID indicating the time point of a configuration, a processing unit that determines in accordance with the acquired configuration log ID whether to display the configuration at the current time point, a processing unit that, if the configuration at the current time point is to be displayed, creates a configuration chart at the current time point by acquiring the configuration information from the configuration log DB and displays the created configuration chart on the screen, and a processing unit that, if the configuration at the current time point is not to be displayed, determines whether to display a past configuration chart.

The configuration log display processor further includes a processing unit that, if the past configuration chart is to be displayed, acquires from the configuration log DB, the configuration information and information on a configuration log table and a configuration element log table, creates a configuration chart from the acquired information, and displays the created configuration chart on the screen, a processing unit that extracts a difference between a configuration element of the configuration chart at the current time point and a configuration element of the past configuration chart and displays the extracted configuration element in a highlighted form, and a processing unit that determines whether recovering the configuration information has been requested.

The configuration log display processor further includes a processing unit that, if recovering the configuration information has been requested, constructs the cloud environment using the past configuration information and displays the corresponding configuration chart on the screen, a processing unit that, if copying the configuration information has not been requested, determines whether copying the configuration information has been requested, a processing unit that, if copying the configuration information has been requested, copies the cloud environment using the current configuration information and displays the corresponding configuration chart on the display to end the process, and a processing unit that, if copying the configuration information has not been requested, notifies the user of an error to end the process.

A document may be registered in a folder and an operation provided by a cloud system may be set to be performed on the document. In a configuration where the folder is created on a per operation basis by a user, it is difficult to construct an environment in which multiple operations provided by the cloud system cooperate with each other.

SUMMARY

Aspects of non-limiting embodiments of the present disclosure relate to providing, in a configuration in which a document is registered in a folder and an operation provided by a cloud system is performed on the document, an information processing apparatus that more easily constructs an environment in which multiple operations provided by a cloud system cooperate with each other than when a user creates a folder on a per operation basis.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes at least one processor. The processor is configured to create, under a first folder associated with a cloud system used by the information processing apparatus, a second folder set to perform operations provided by the cloud system, and is configured to perform control to perform the operations provided by the cloud system set in the second folder if a document is registered in the second folder.

BRIEF DESCRIPTION OF THE DRAWINGS

Exemplary embodiment of the present disclosure will be described in detail based on the following figures, wherein:

FIG. 6 illustrates an example of a data structure of a folder management table;

FIG. 8 illustrates an example of a data structure of the folder management table;

FIG. 9 illustrates a process example of the exemplary embodiment;

FIG. 11 is a flowchart illustrating a process example of the exemplary embodiment;

FIG. 14A through 14C illustrate a process example of the exemplary embodiment.

DETAILED DESCRIPTION

Figure 1:
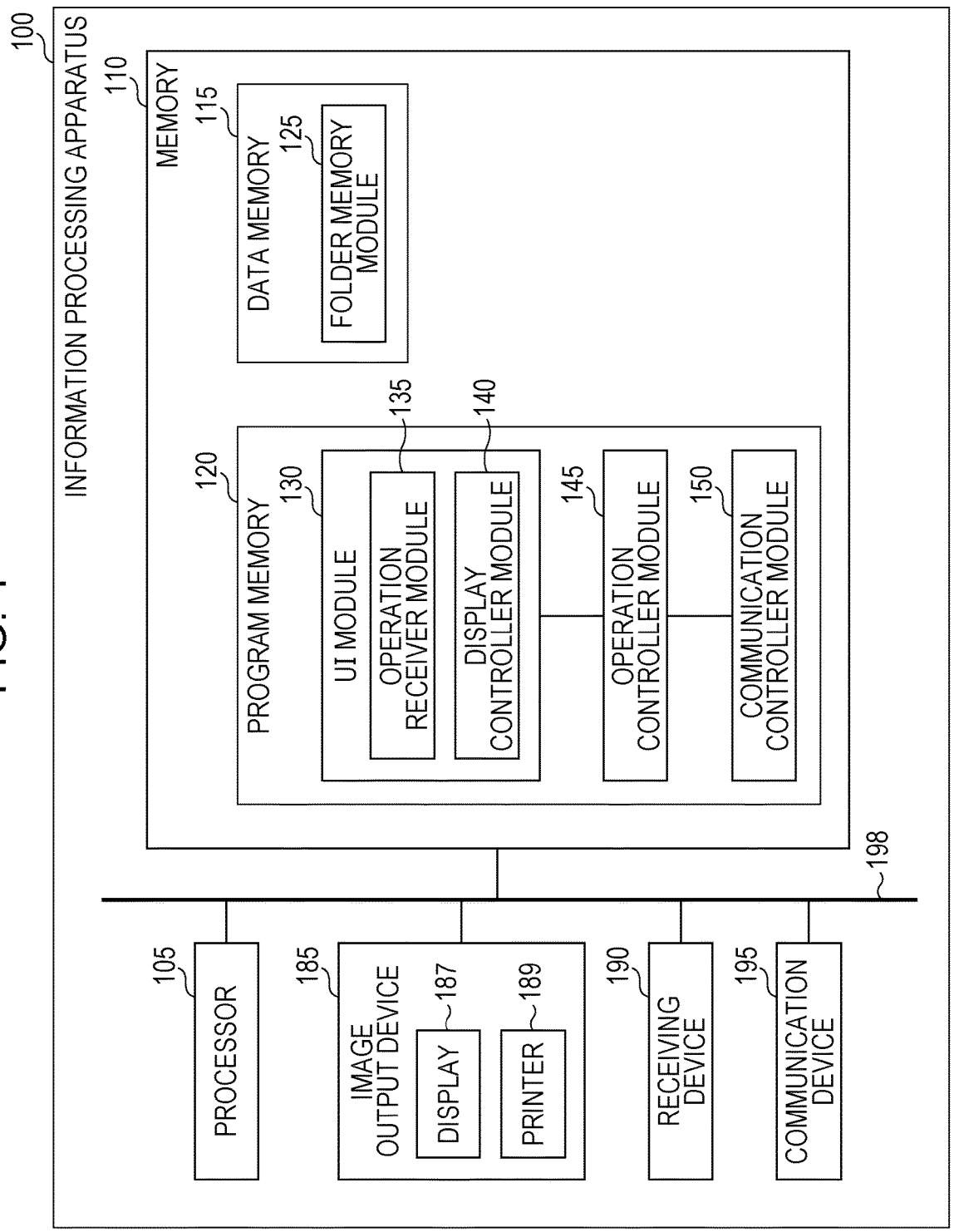
FIG. 1 illustrates a module diagram illustrating a conceptual configuration of the exemplary embodiment.

Exemplary embodiment of the disclosure is described below with reference to the drawings. FIG. 1 illustrates a module diagram illustrating a conceptual configuration of the exemplary embodiment. The term "module" refers to a software component (including a computer program) that is logically separable, or a hardware component. The module of the exemplary embodiment refers to not only a module in a computer program but also a module in a hardware configuration. The discussion of the exemplary embodiment also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information". The modules may correspond to the functions in a one-to-one correspondence. In software implementation, one module may be configured of one program or multiple modules may be configured of one program. One module may be configured of multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, data reference relationship, or login). The term "predetermined" means that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other. A statement that "if A, B is to be performed" is intended to mean that it is determined whether something is A, and that if something is determined as A, an action B is to be taken. The statement becomes meaningless if the determination as to whether something is A is not performed. If a discussion is made of events "A, B, and C", the events "A, B, and C" are quoted as an exemplary purpose only unless otherwise noted. For example, something is applicable to the case in which only the event A is selected.

The term "system" and the term "apparatus" refer to an arrangement where multiple computers, a hardware configuration, and an apparatus are interconnected via a communication network (including a one-to-one communication connection). The term system and the term apparatus also refer to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate.

An information processing apparatus 100 of the exemplary embodiment has a control function to cause a cloud system to perform an operation on a document if the document is registered on a folder. Referring to FIG. 1, the information processing apparatus 100 includes at least a processor 105 and memory 110. The information processing apparatus 100 further includes a bus 198 that connects the processor 105 to the memory 110. The information processing apparatus 100 may further include an image output device 185, receiving device 190, and communication device 195. The processor 105, memory 110, image output device 185, receiving device 190, and communication device 195 exchange data with each other via the bus 198.

The block diagram in FIG. 1 illustrates a hardware configuration of a computer that implements the exemplary embodiment. The hardware configuration of the computer that executes a program of the exemplary embodiment is that of the computer in FIG. 1 and is specifically a personal computer or a server. The hardware configuration includes the processor 105 as a processing unit and the memory 110 as a storage device.

The information processing apparatus 100 may include one or more processors 105. The processor 105 may include a central processing unit (CPU) or a microprocessor. If multiple processors 105 are employed, they may be tightly-coupled multiprocessors or loosely-coupled multiprocessors. For example, multiple processor cores may be mounted in a single processor 105. Multiple processors may be connected via a communication network to work as a virtual single computer in a system. Specifically, loosely-coupled multiprocessors may be configured as a cluster system or a computer cluster. The processor 105 executes a program on a program memory 120.

The memory 110 may be a semiconductor memory, such as a register or a cache memory, in the processor 105 or a storage device, such as a random-access memory (RAM) and a read-only memory (ROM). The memory 110 may be a long-life internal memory device, such as a hard disk drive (HDD) or a solid-state drive (SSD), or an external storage device or an auxiliary storage device, such as a compact disk (CD), digital versatile disk (DVD), Blu-ray (registered trademark) disc, universal serial bus (USB) memory, or memory card. The memory 110 may also be a storage device in a server connected via a communication network.

The memory 110 includes the program memory 120 that stores programs and the data memory 115 that stores data. The program memory 120 and the data memory 115 may store not only programs of illustrated modules but also a program, such as an operating system (OS) used to start up the computer, and parameter data that varies as appropriate in the execution of the modules.

The image output device 185 includes a display 187 and printer 189. The display 187 may be a liquid-crystal display, organic electroluminescent (EL) display, or three-dimensional display. The display 187 displays operation results of the processor 105 and data on the data memory 115 in the form of text and image. The printer 189 may be a multi-function device having the functions of a printer and a copying machine. The printer 189 prints the operation results of the processor 105 and the data on the data memory 115. The image output device 185 may further include a speaker and/or an actuator to vibrate device.

The receiving device 190 receives data responsive to user operations (including action, voice, and eye gaze) on a keyboard, mouse, microphone, camera (including an eye-gaze detection camera) or image data resulting from the scanning operation of a scanner.

A touch screen having the functions of the display 187 and the receiving device 190 may be employed. In such a case, without a physical keyboard, a software keyboard or a screen keyboard may be drawn on the touch screen to implement of the keyboard function.

The display 187 and the receiving device 190 may be used as a user interface.

Figure 2:
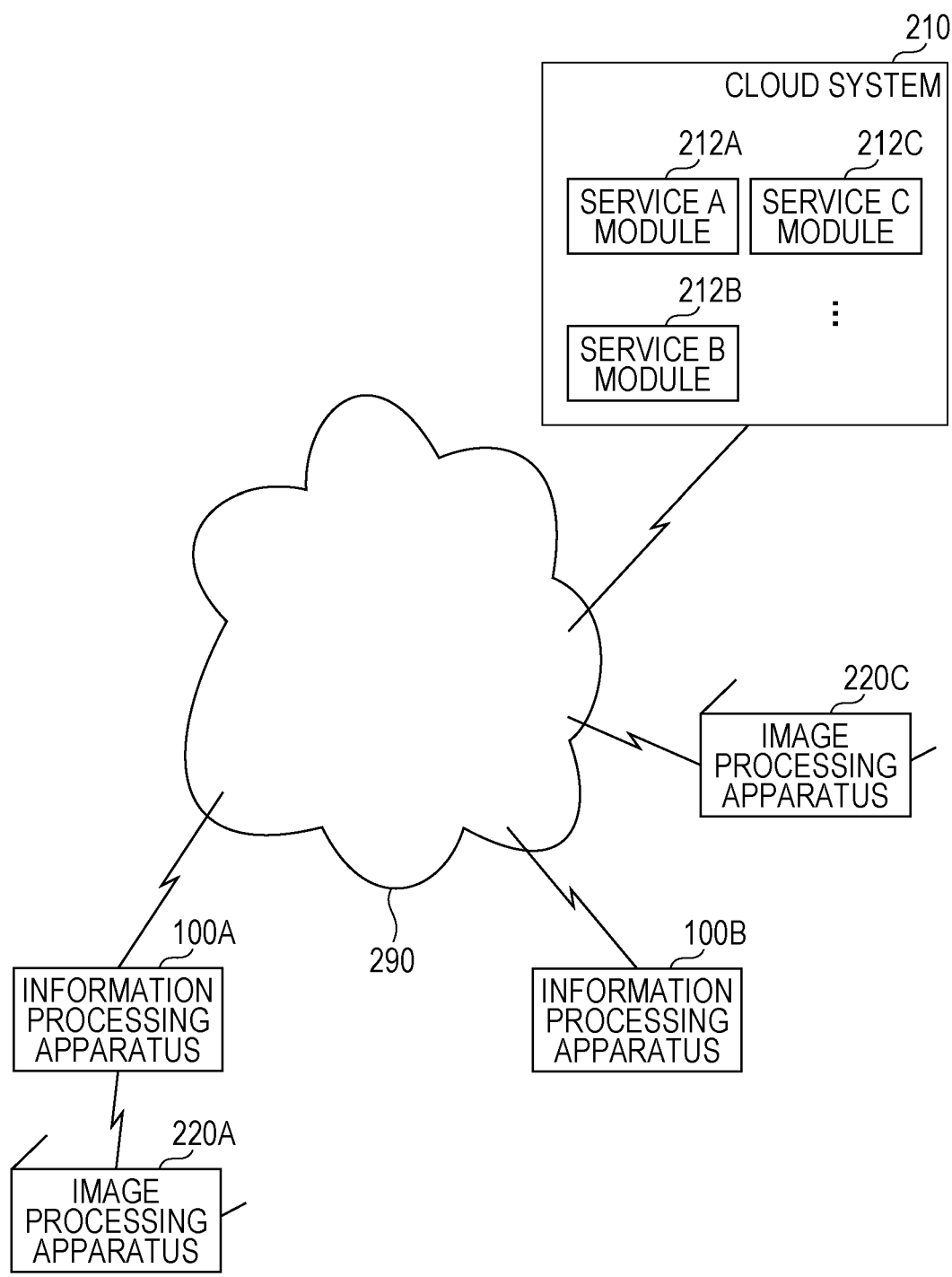
FIG. 2 illustrates an example of a system configuration of the exemplary embodiment.

Referring to FIG. 2, the communication device 195 is a communication network interface, such as a network card, and is used to connect to other apparatuses, such as a cloud system 210 and image processing apparatus 220, via the communication network.

The computer program of the exemplary embodiment is installed on the program memory 120 as the hardware configuration. The exemplary embodiment is thus implemented by causing software and hardware to work in cooperation.

The hardware configuration in FIG. 1 is illustrated for exemplary purposes only. The exemplary embodiment is not limited to the hardware configuration in FIG. 1. The exemplary embodiment may be any configuration as long as the configuration implements the modules of the exemplary embodiment. For example, the processor 105 may include a graphics processing unit (GPU) (including general-purpose computing on graphics processing units (GPGPU)). Part of the modules may be implemented using dedicated hardware (such as application specific integrated circuit (ASIC)) or a reconfigurable integrated circuit (such as field-programmable gate array (FPGA)). In another example, some modules may be in an external system and connected to the system of FIG. 1 via a communication network. In yet another example, plural systems in FIG. 1 may be interconnected to each other via a communication line such that the systems operate in concert with each other. One of the modules may be incorporated not only in a personal computer, but also in a mobile information and communication device (such as a mobile phone, smart phone, mobile device, and wearable computer), information appliance, robot, copying machine, fax, scanner, printer, multi-function devices (an image processing apparatus having at least two of the functions of the scanner, printer, copying machine, and fax).

The processor 105 is connected via the bus 198 to the memory 110, image output device 185, receiving device 190, and communication device 195. The processor 105 performs an operation in accordance with a computer program that describes an execution sequence of each module serving as the program on the program memory 120. When the receiving device 190 receives a user operation, the processor 105 performs the operation of the module corresponding to the user operation. The processor 105 stores the operation results on the data memory 115 and outputs the operation results to the display 187, and controls the communication device 195 to transmit the operation results to another apparatus.

The memory 110 includes the data memory 115 and program memory 120 and is connected via the bus 198 to the processor 105, image output device 185, receiving device 190, and communication device 195.

The data memory 115 stores a folder memory module 125.

The folder memory module 125 stores a folder that is set to perform an operation on a document if the document is registered in the folder.

The word "folder" is interchangeable with the word "directory" and registers documents and folders.

The folder corresponding to the cloud system 210 that is available to the information processing apparatus 100 is designated as a first folder. An operation relating to a document is performed if the document is registered in a folder. Such a folder is designated as a second folder.

The second folder is stored in the first folder. In other words, the first folder serves as a parent in the tree structure of the second folder. Similarly, the second folder serves as a child in the tree structure of the first folder. The first folder may include multiple second folders. The first folder may store documents. In such a case, the first folder includes the documents and the second folder. The documents and the second folder are siblings in the tree structure.

An "operation of the cloud system 210" may be an operation relating to the document registered in the second folder. An "operation relating to the document" means any operation that is performed on the document when the document is registered in the second folder. Such operations may include modifying the document itself and setting a registration destination without modifying the document. The operations further include an operation of adding text to the document by character-recognizing an image in the document, an operation of modifying the name of the document using contents of the document, and an operation of setting the registration destination of the document in response to the contents of the document and registering the document at the registration destination.

To perform the "operation of the cloud system 210 set in the second folder", an operation to be performed by the cloud system 210 may be set on a per folder basis. Specifically, the folder memory module 125 stores a folder management table 600 illustrated in FIG. 6.

The program memory 120 stores a user interface (UI) module 130, operation controller module 145, and communication controller module 150. Each module in the program memory 120 is executed by the processor 105. In the following discussion of each module, contents of the operations performed by the processor 105 are described.

The UI module 130 includes an operation receiver module 135 and display controller module 140 and is connected to the operation controller module 145. The UI module 130 performs an operation relating to the user interface.

The operation receiver module 135 detects a user operation received by the receiving device 190. The user operations include selecting a document, moving a document onto a folder, and registering a document in the folder.

The display controller module 140 performs control to display a folder, document, and icons for the folder and document on the display 187.

The display controller module 140 may perform control to display an image, indicating the status of an operation of the cloud system 210 corresponding to the second folder, in overlay on the second folder on the display 187.

In this case, the image may be overlaid on the whole or part of the second folder.

If the operation of the cloud system 210 corresponding to the second folder is not available, the display controller module 140 performs control to cause the display 187 to display an indication indicating that the document is not registerable in the second folder.

The display controller module 140 may perform control to cause the display 187 to display, in overlay on the second folder, an image indicating the status of an operation of the cloud system 210 corresponding to the second folder and indicating the status of an operation of the information processing apparatus 100 relating to that operation of the cloud system 210.

The status of the operation of the information processing apparatus 100 responsive to the operation of the cloud system 210 is an operation performed by the information processing apparatus 100 to perform the operation of the cloud system 210. For example, such operations include (1) operation of transmitting a document to the cloud system 210 and (2) operation of receiving data subsequent to the operation of the cloud system 210.

The operation controller module 145 is connected to the UI module 130 and communication controller module 150. The operation controller module 145 creates under the first folder the second folder that is set to perform the operation provided by the cloud system 210. The first folder corresponds to the cloud system 210 available to the information processing apparatus 100. Specifically, the first folder corresponds to the cloud system 210 and the second folder corresponds to services of the cloud system 210 (in FIG. 2, a service A module 212A, service B module 212B, and service C module 212C).

If a document is registered in the second folder, the operation controller module 145 performs control to perform the operation of the cloud system 210 set in the second folder.

The first folder may be automatically created. In such a case, the first folder corresponding to the cloud system 210 available to the information processing apparatus 100 is created before the second folder is created. The phrase "before the second folder is created" may be interpreted as meaning that the communication with the cloud system 210 is ready.

The operations provided by the cloud system 210 are also referred to as cloud services. The operation provided by the cloud system 210 is any operation that is performed on a document when the document is registered in the second folder. The operations include modifying the document and setting the registration destination without modifying the document. For example, the operations include an operation of character-recognizing an image in the document and adding text, an operation of modifying the name of the document using contents of the document, and an operation of setting the registration destination of the document in response to the contents of the document and registering the document at the registration destination.

If a device available to the information processing apparatus 100 is connected, the operation controller module 145 creates the second folder set to perform an operation, relating to the device, from among the operations provided by the cloud system 210.

The device may be an image processing apparatus, such as a multi-function apparatus. The operations relating to the device may include an operation of handling data processable by the device or an operation of outputting the data processable by the device. If the device is the image processing apparatus, the operation relating to the device is a character recognition operation processing an image.

The second folder that is set to perform only the operation relating to the device may be created or the second folder that is set to perform the operation provided by the cloud system 210 may be created as one of the second folders. When the second folder that is set to perform only the operation relating to the device is created, a second folder set to perform the operation relating to a device that is not connected is not created.

The operation controller module 145 may create the second folder that is set to perform the operation relating to a document that the device is enabled to output from among the operations provided by the cloud system 210.

If the device is an image processing apparatus, the document that the device is enabled to output is an image resulting from scanning the document on the image processing apparatus, an image resulting from fax reception on the image processing apparatus, or other images.

The operation controller module 145 may create the second folder when the first folder is specified.

The state in which the first folder is specified may be triggered by an operation to open the first folder. When the first folder is opened, the second folder corresponding to the latest operation provided by the cloud system 210 is displayed.

The communication controller module 150 is connected to the operation controller module 145. The communication of the communication controller module 150 with the cloud system 210 is triggered by the registration of a document. For example, the communication controller module 150 performs communication requesting the cloud system 210 to perform an operation, transmits a document to the cloud system 210, receives operation results from the cloud system 210, and performs other operations.

FIG. 2 illustrates a system configuration of the exemplary embodiment. Information processing apparatuses 100A and 100B, cloud system 210, and image processing apparatus 220C are interconnected to each other via a communication network 290. The communication network 290 may be a wired network, wireless network, or a combination thereof. For example, the communication network 290 may be the Internet and/or intranet service as a communication infrastructure.

The cloud system 210 has functions provided by the service A module 212A, service B module 212B, service C module 212C, and the like. The functions of the cloud system 210 are implemented as a cloud service.

The information processing apparatus 100A is connected to the image processing apparatus 220A via a communication network. The information processing apparatus 100A may use the image processing apparatus 220A. The information processing apparatus 100B may use the image processing apparatus 220C via the communication network 290. The state in which the connection with the image processing apparatus 220 available to the information processing apparatus 100 is established may be provided (1) if direct connection condition is satisfied such as in the case where the information processing apparatus 100A is directly connected to the image processing apparatus 220A, for example, in accordance with a predetermined standard, such universal serial bus (USB) standard, (2) if network connection condition is satisfied such as in the case where the information processing apparatus 100B is connected with the image processing apparatus 220C via the communication network 290, or if (3) one of the conditions (1) and (2) is satisfied (determined by OR gating the conditions (1) and (2)).

A folder corresponding to the cloud system 210 is displayed as the first folder on the display 187 in the information processing apparatus 100. The display 187 in the information processing apparatus 100 also displays as the second folders corresponding to the service A module 212A, service B module 212B, and service C module 212C under the first folder.

The creation condition of the second folder corresponding to the service A module 212A may be that the image processing apparatus 220 is configured to be in USB connection. The second folder corresponding to the service A module 212A is created on the information processing apparatus 100A but the second folder corresponding to the service A module 212A is not created on the information processing apparatus 100B.

The user of the information processing apparatus 100A causes the image processing apparatus 220A to read a paper document and registers a digital document of the paper document in the second folder corresponding to the service A module 212A in the cloud system 210. The digital document is thus transmitted to the service A module 212A of the cloud system 210 corresponding to the second folder. The service A module 212A performs the character recognition on the digital document and transmits the results of the character recognition to the information processing apparatus 100A.

Figure 3:
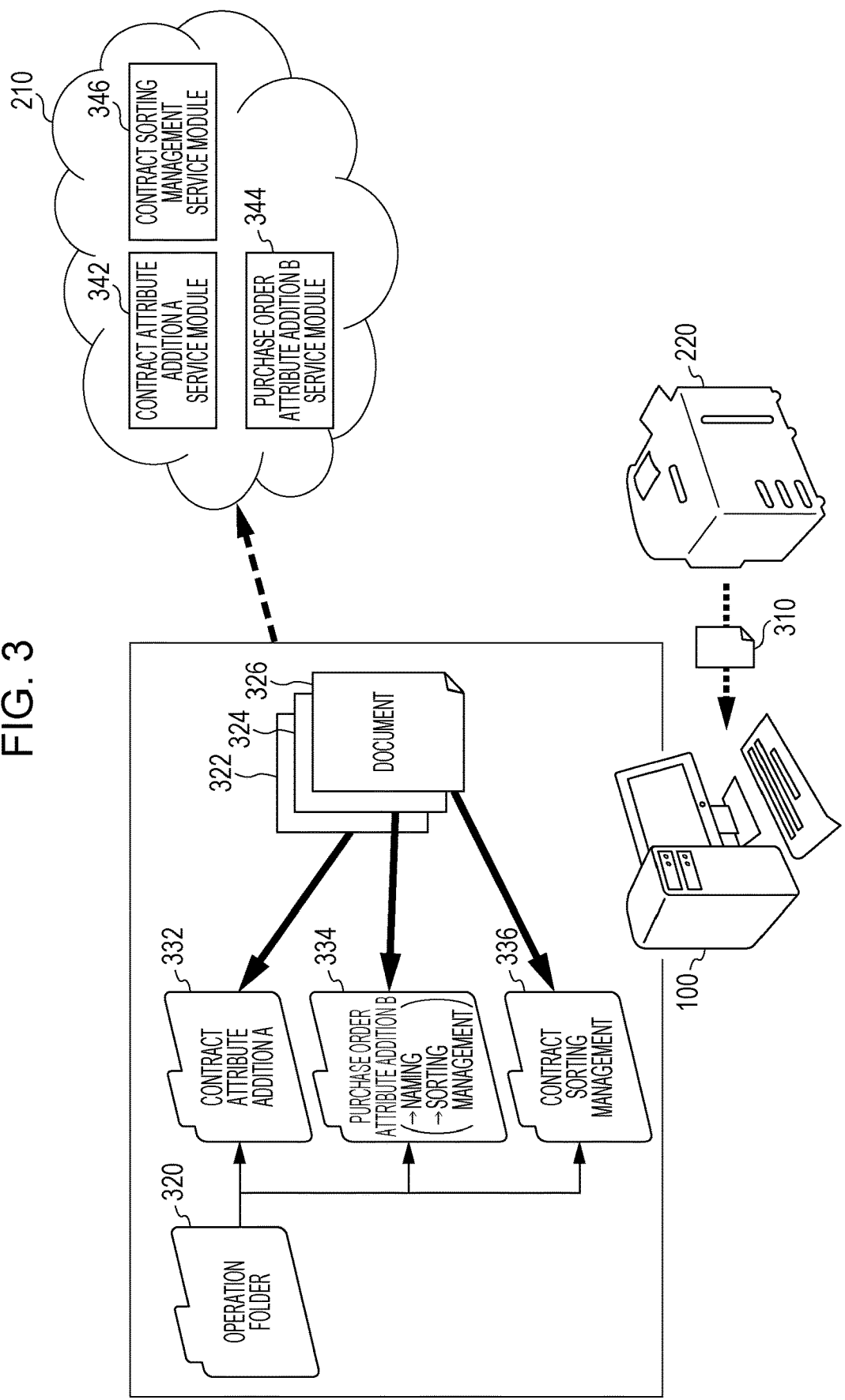
FIG. 3 illustrates a process example of the exemplary embodiment.

FIG. 3 illustrates a process example of the exemplary embodiment. The cloud system 210 includes a contract attribute addition A service module 342, purchase order attribute addition B service module 344, and contract sorting management service module 346. The contract attribute addition A service module 342 and other modules are an example of the service module 212 in FIG. 2.

The image processing apparatus 220 reads a paper document to create a document 310. The image processing apparatus 220 then transmits the document 310 to the information processing apparatus 100. Referring to FIG. 2, like the image processing apparatus 220A, the image processing apparatus 220 is connected to the information processing apparatus 100. The image processing apparatus 220 may not only store directly the document 310 onto the information processing apparatus 100 but may also store the document 310 onto the information processing apparatus 100 via the communication network 290 through a network scan function in the same way as in the image processing apparatus 220C connected to the communication network 290. In this way, the image processing apparatus 220 creates documents 322, 324, and 326 by reading the paper documents.

The information processing apparatus 100 stores under an operation folder 320 a contract attribute addition A folder 332, purchase order attribute addition B folder 334 and contract sorting management folder 336. The operation folder 320 is typically displayed on a desk top. When the operation folder 320 is opened, the contract attribute addition A folder 332, purchase order attribute addition B folder 334 and contract sorting management folder 336 are displayed. For example, a document 322 is stored in the contract attribute addition A folder 332, a document 324 is stored in the purchase order attribute addition B folder 334, and a document 326 is stored in the contract sorting management folder 336. The document 322 is transferred to the contract attribute addition A service module 342 of the cloud system 210 assigned to the contract attribute addition A folder 332. The contract attribute addition A service module 342 then performs an operation for attribute addition A on the document 322. The file name of the document 322 read by the image processing apparatus 220 may be date. The contract attribute addition A service module 342 performs character recognition on a title region of the document 322 and performs an operation to set the character recognition results to be a file name. The document 324 is transferred to the purchase order attribute addition B service module 344 of the cloud system 210 assigned to the purchase order attribute addition B folder 334. The purchase order attribute addition B service module 344 performs an operation for attribute addition B on the document 324. The file name of the document 324 read by the image processing apparatus 220 may be date. The purchase order attribute addition B service module 344 performs character recognition on a title region of the document 324 and sets the character recognition results to be the file name of the document 324. In response to the character recognition results, the purchase order attribute addition B service module 344 performs an operation of sorting the document 324 into storage locations. The document 326 is transferred to the contract sorting management service module 346 of the cloud system 210 assigned to the contract sorting management folder 336. The contract sorting management service module 346 performs sorting management on the document 326. For example, the contract sorting management service module 346 performs character recognition on a title region of the document 326 and performs an operation to sort the document 326 into storage location in accordance with the character recognition results.

The operation folder 320 may be assigned to the cloud system 210. If multiple cloud systems 210 are used, multiple operation folders 320 are also used.

The document 322 to be registered in the contract attribute addition A service module 342 is a document of the image read by the image processing apparatus 220. The document 322 to be registered in the contract attribute addition A service module 342 may be a document that is created by using a document production program.

If the information processing apparatus 100 is used in the manner described above in a remote office work environment, access from anywhere to the cloud system 210 may be possible. Various companies have commercialized services of a cloud system that receive and store documents from users. The market for the services currently tends to expand.

Variety of services to store and edit documents in the services of the cloud system 210 are provided. Users may create and customize applications.

In one method of uploading a document to a service of the cloud system 210, a folder on the information processing apparatus 100 as a client and a service of the cloud system 210 are configured to cooperate with each other to upload the document stored in the folder to the service of the cloud system 210. In an environment, a user may attempt to create the folder without using the exemplary embodiment, but such an environment is difficult to organize. Since the cloud system 210 includes multiple services, the user may create a folder on a per service basis. In such a case, a service of the cloud system 210 may be erroneously associated with a folder. Multiple folders may be associated with each service. If the exemplary embodiment is not used, association information of the folders may be referenced to determine which folder is associated with each service because the display forms of the folders remain the same.

Figure 4:
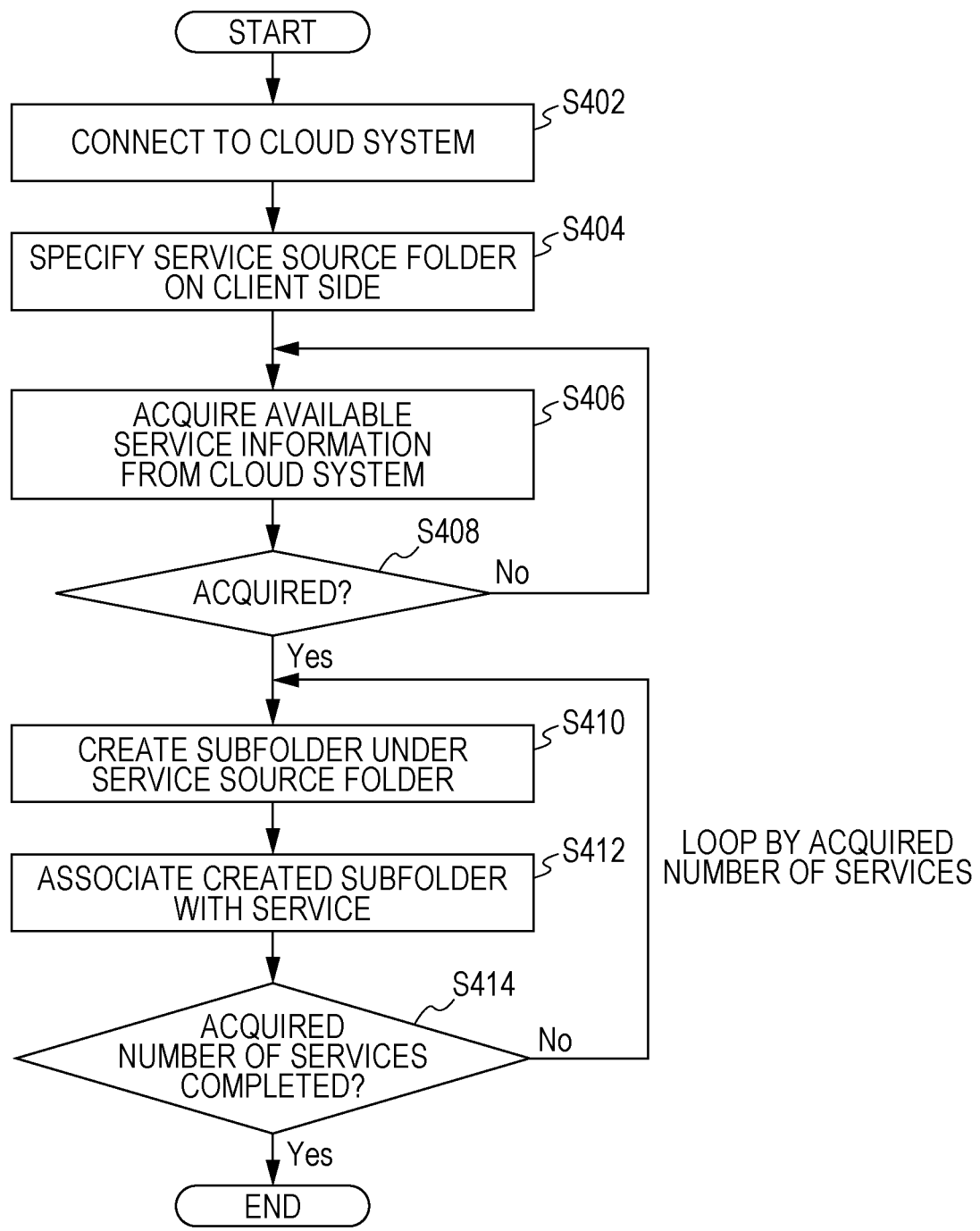
FIG. 4 is a flowchart illustrating a process example of the exemplary embodiment.

FIG. 4 is a flowchart illustrating a process example of the exemplary embodiment. The process represented by the flowchart is performed by the information processing apparatus 100.

In step S402, the information processing apparatus 100 is connected to the cloud system 210.

In step S404, a service source folder on the information processing apparatus 100 on a client side is specified. The service source folder is an example of the first folder and is in cooperation with the cloud system 210. The service source folder may be specified by a user or a predetermined folder may be specified as the service folder by the information processing apparatus 100. If the service source folder is specified by the predetermined information processing apparatus 100, the specified service source folder is the folder associated with the cloud system 210.

In step S406, service information is acquired from the cloud system 210.

In step S408, the information processing apparatus 100 determines whether the available service information has been acquired. If the available service information has been acquired, processing proceeds to step S410; otherwise processing returns to step S406.

In step S410, the information processing apparatus 100 creates a subfolder under the service source folder. The subfolder is an example of the second folder.

In step S412, the information processing apparatus 100 associates the created subfolder with a service. Through this association, an operation using the service associated with the subfolder is performed on the document registered in the subfolder.

In step S414, the information processing apparatus 100 determines whether operations corresponding to the number of services has been completed. If the operations corresponding to the number of services has been completed, the information processing apparatus 100 ends the process; otherwise, the information processing apparatus 100 returns to step S410 to loop by the acquired number of services.

Figure 5:
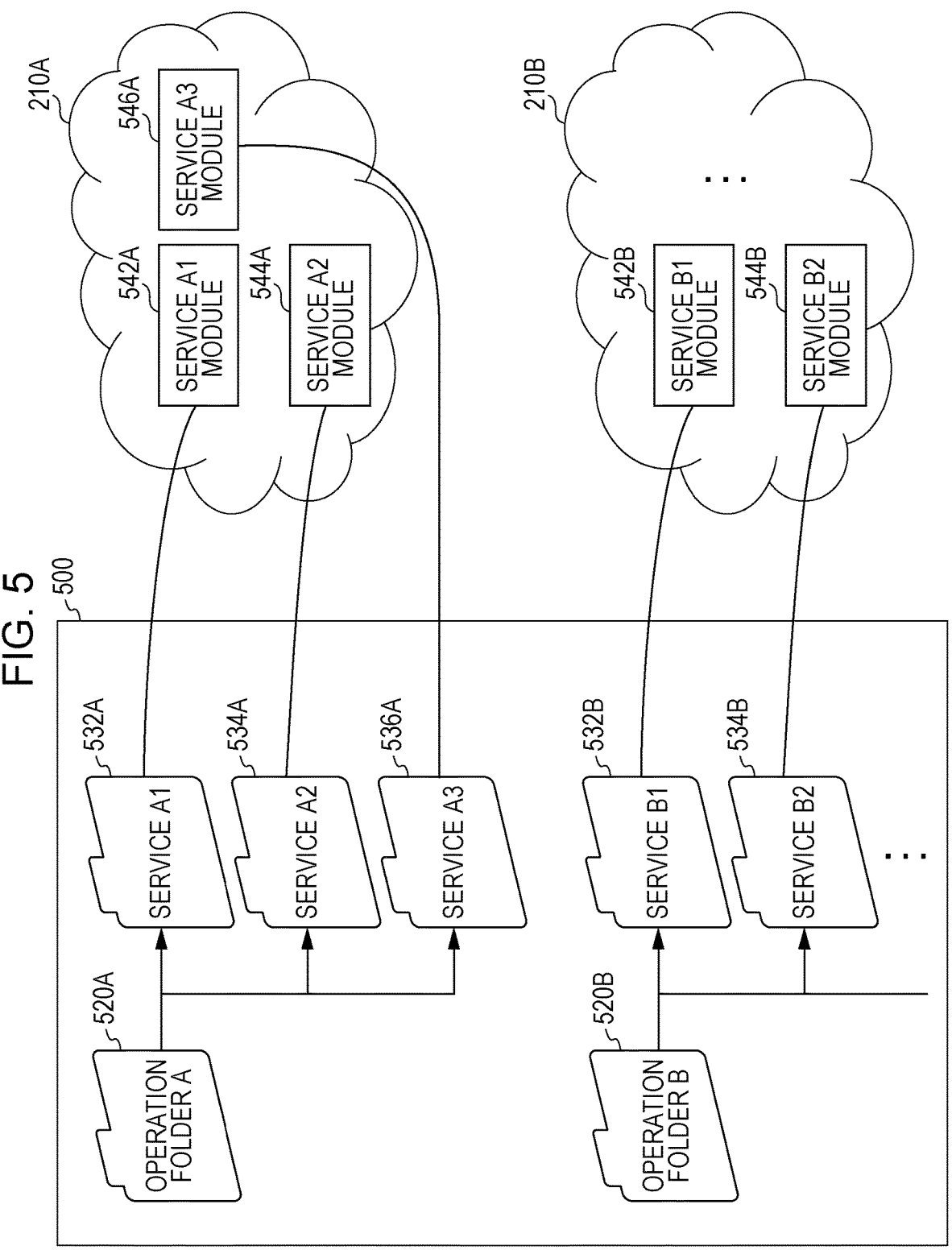
FIG. 5 illustrates a process example of the exemplary embodiment.

FIG. 5 illustrates a process example of the exemplary embodiment. In accordance with the process of the flowchart in FIG. 4, the information processing apparatus 100 creates a folder and displays the folder on a screen 500.

A cloud system 210A includes a service A1 module 542A, service A2 module 544A, and service A3 module 546A.

A cloud system 210B includes a service B1 module 542B and service B2 module 544B.

An operation folder A 520A is associated with the cloud system 210A and an operation folder B 520B is associated with the cloud system 210B.

The operation folder A 520A and operation folder B 520B are displayed on the screen 500 of the information processing apparatus 100. If the operation folder A 520A is opened, a service A1 532A, service A2 534A, service A3 536A are displayed on the screen 500. The service A1 module 532A, service A2 534A, and service A3 536A are created respectively in association with the service A1 module 542A, service A2 module 544A, and service A3 module 546A. If the operation folder B 520B is opened, a service B1 532B and service B2 534B are displayed on the screen 500. The service B1 532B and service B2 534B are created respectively in association with the service B1 module 542B and service B2 module 544B.

FIG. 6 illustrates an example of a data structure of a folder management table 600. The folder management table 600 is stored on the folder memory module 125. If the association in FIG. 5 is performed in accordance with the process in FIG. 4, the folder management table 600 is created. If a document is registered in the second folder, the operation of the cloud system 210 set in the second folder is performed. To this end, the folder management table 600 simply includes a folder identification (ID) column 605 and association destination column 625.

The folder management table 600 includes the folder ID column 605, service source folder flag column 610, parent folder column 615, folder name column 620, and association destination column 625. In accordance with the exemplary embodiment, the folder ID column 605 stores information uniquely identifying a folder (specifically, a folder identification (ID)). The service source folder flag column 610 stores a flag indicating whether the folder is a service source folder. For example, the flag "1" indicates that the folder is a service source folder and the flag "0" indicates that the folder is not a service source folder but a subfolder. The parent folder column 615 stores a parent folder of the folder. If the folder is a service source folder, there is no parent folder. If the folder is a subfolder, a service source folder is indicated as a parent to the subfolder. The folder name column 620 stores the name of the folder. The association destination column 625 stores the association destination associated with the folder. Specifically, the association destination column 625 stores the cloud system 210 and the service of the cloud system 210.

The first row of the folder management table 600 indicates that folder ID F000A1 is a service source folder and has no parent folder (denoted by symbol "-"), the folder name is operation folder A, and the association destination is a cloud system 210A. The second row of the folder management table 600 indicates that folder ID F000A2 is not a service source folder, the parent folder is F000A1, the folder name is service A1, and the association destination is service A1 module 542A of the cloud system 210A. The third row of the folder management table 600 indicates that folder ID F000A3 is not a service source folder, the parent folder is F000A1, the folder name is service A2, and the association destination is service A2 module 544A of the cloud system 210A. The fourth row of the folder management table 600 indicates that folder ID F000A4 is not a service source folder, the parent folder is F000A1, the folder name is service A3, and the association destination is service A3 module 546A of the cloud system 210A. The fifth row of the folder management table 600 indicates that folder ID F000B1 is a service source folder and has no parent folder (denoted by symbol "-"), the folder name is operation folder B, and the association destination is cloud system 210B. The sixth row of the folder management table 600 indicates that folder ID F000B2 is not a service source folder, the parent folder is F000B1, the folder name is service B1, and the association destination is service B1 module 542B of the cloud system 210B. The seventh row of the folder management table 600 indicates that folder ID F000B3 is not a service source folder, the parent folder is F000B1, the folder name is service B2, and the association destination is service B2 module 544B of the cloud system 210B.

Figure 7:
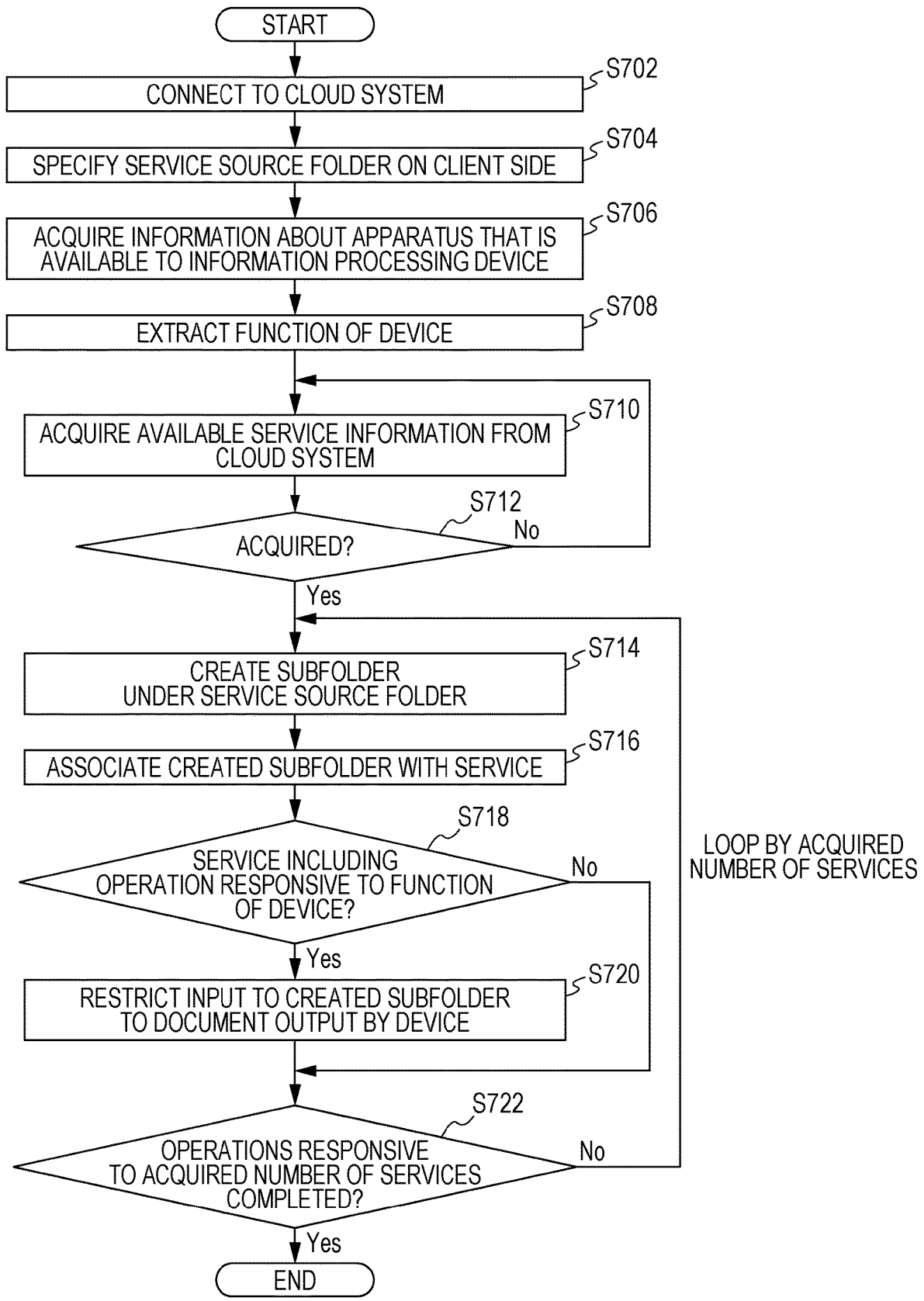
FIG. 7 is a flowchart illustrating a process example of the exemplary embodiment.

FIG. 7 is a flowchart illustrating a process example of the exemplary embodiment. The process illustrated in the flowchart is performed by the information processing apparatus 100. A process of creating a subfolder with a device available to the information processing apparatus 100 connected is added to the process of the flowchart in FIG. 4.

In step S702, the information processing apparatus 100 is connected to the cloud system 210.

In step S704, a service source folder on the information processing apparatus 100 on the client side is specified.

In step S706, information on a device available to the information processing apparatus 100 is acquired. For example, the connection of the image processing apparatus 220 to the information processing apparatus 100 is detected. The determination of whether the device is available to the information processing apparatus 100 may be made based on not only the connection with the information processing apparatus 100 but also the switch-on status of the device.

In step S708, the function of the device is extracted. For example, the information processing apparatus 100 may inquire of the function of the device via the communication with the device or may organize in advance a table that stores the functions associated with the device and extract the function using the table.

In step S710, the information processing apparatus 100 acquires available service information from the cloud system 210.

In step S712, the information processing apparatus 100 determines whether the available service information has been acquired. If the available service information has been acquired, processing proceeds to step S714; otherwise processing returns to step S710.

In step S714, the information processing apparatus 100 creates a subfolder under the service source folder.

In step S716, the information processing apparatus 100 associates the created subfolder with a service.

In step S718, the information processing apparatus 100 determines whether the service has an operation responsive to the function of the device. If the service has the operation responsive to the function of the device, processing proceeds to step S720; otherwise, processing proceeds to step S722. If the device is the image processing apparatus 220, the function of the device is scanning a paper document and outputting a document of the resulting image. In such a case, the service of the cloud system 210 is provided based on the condition that the operation responsive to the function is enabled to process the document of the image.

In step S720, the created subfolder receives only the document output from the device. In the example described with reference to step S718, the target subfolder receives only the document of the image output from the device. For example, a document produced by a document production program is not received.

In step S722, the information processing apparatus 100 determines whether the operations responsive to the number of services have been completed. If the operations have been completed, processing ends. If the operations have not been completed, processing returns to step S714 and loops by the number of services.

FIG. 8 illustrates an example of a data structure of a folder management table 800. The folder management table 800 is stored on the folder memory module 125. The folder management table 800 is created in accordance with the process in the flowchart in FIG. 7. The folder management table 800 is created by adding a reception restriction column 830 to the folder management table 600.

The folder management table 800 includes a folder ID column 805, service source folder flag column 810, parent folder column 815, folder name column 820, association destination column 825, and reception restriction column 830. The folder ID column 805 stores the folder ID. The service source folder flag column 810 stores a flag indicating whether the folder is a service source folder. The parent folder column 815 stores a parent folder of the folder. The folder name column 820 stores the name of the folder. The association destination column 825 stores the association destination associated with the folder. The reception restriction column 830 stores the type of a document that the folder is permitted to receive. Documents of the other type is not received by the folder.

The second row of the folder management table 800 indicates that the folder ID F000A2 is not a service source folder, the parent folder is F000A1, the folder name is service A1, the association destination is the service A1 module 542A of the cloud system 210A, and the reception restriction is a document of an image received from the image processing apparatus 220.

FIG. 9 illustrates a process example of the exemplary embodiment, namely, an example of folders in the first through fourth rows of the folder management table 800 in FIG. 8. The first row of the folder management table 800 displays the operation folder A 520A, the second row of the folder management table 800 displays the service A1 module 532A, the third row of the folder management table 800 displays the service A2 534A, and the fourth row of the folder management table 800 displays the service A3 536A. A restriction is imposed such that the service A1 module 532A receives only the document of an image received from the image processing apparatus 220.

The image processing apparatus 220 reads a paper document to create a document 910 and transmits the document 910 to the information processing apparatus 100. The information processing apparatus 100 receives the document 910. A document 920 is created by the document production program. The document 910 may be registered in the service A1 module 532A but the document 920 is not permitted to be registered in the service A1 module 532A. Even if a user attempts to register the document 920 in the service A1 module 532A, the information processing apparatus 100 may display an alert indicating that the document 920 is not acceptable. An operation of the service A1 module 542A of the cloud system 210A associated with the service A1 532A is performed on the document 910 registered in the service A1 module 532A. For example, the operation may be character recognition of the document of the image.

Figure 10:
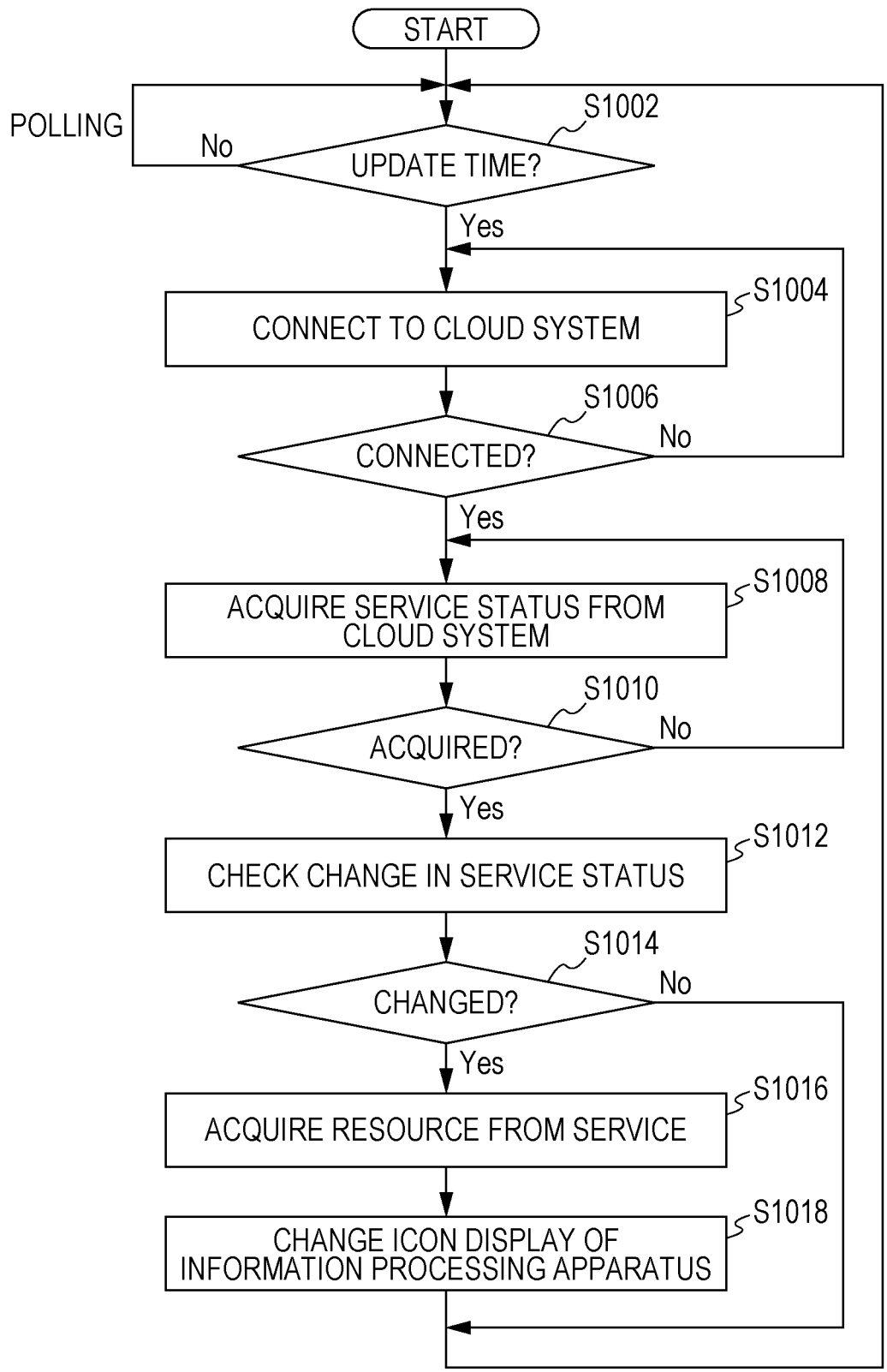
FIG. 10 is a flowchart illustrating a process example of the exemplary embodiment.

FIG. 10 is a flowchart illustrating a process example of the exemplary embodiment. The process in the flowchart is performed by the information processing apparatus 100. The information processing apparatus 100 acquires the operation status of the service in the cloud system 210 and modifies a display form of a subfolder associated with that service.

In step S1002, the information processing apparatus 100 determines whether it is update time. If it is update time, processing proceeds to step S1004; otherwise, the information processing apparatus 100 waits on standby until the update time. Specifically, the information processing apparatus 100 periodically makes a polling operation to the cloud system 210. In step S1004, the information processing apparatus 100 is connected to the cloud system 210.

In step S1006, the information processing apparatus 100 determines whether the information processing apparatus 100 has been connected to the cloud system 210. If the information processing apparatus 100 has been connected, processing proceeds to step S1008; otherwise, processing returns to step S1004.

In step S1008, the information processing apparatus 100 acquires the service status from the cloud system 210. The service status may be one of the standby state, in-progress state (with the completed percentage of the whole operation indicated), completed state, and suspension state. An example of unavailable status is the suspension state.

In step S1010, the information processing apparatus 100 determines whether the service status has been acquired. If the service status has been acquired, processing proceeds to step S1012; otherwise, processing returns to step S1008.

In step S1012, the information processing apparatus 100 determines whether the service status has changed. If the service status remains unchanged from the previously acquired status, the information processing apparatus 100 is free from modifying the display form of the subfolder.

In step S1014, the information processing apparatus 100 determines whether the service status has changed. If the service status has changed, processing proceeds to step S1016; otherwise, processing returns to step S1002. In step S1016, the information processing apparatus 100 acquires a resource from the service.

In step S1018, the information processing apparatus 100 modifies an icon of the information processing apparatus 100 and returns to step S1002. The icon indicating the service status acquired in step S1008 or the resource acquired in step S1016 is created and is then displayed in overlay on the subfolder associated with the service.

FIG. 11 is a flowchart illustrating a process example of the exemplary embodiment. The process in the flowchart is performed by the information processing apparatus 100. The information processing apparatus 100 acquires the service status and modifies the display form of the subfolder associated with the service. If a document is registered in the subfolder, most of the operations are performed by corresponding services in the cloud system 210. But there are some operations that are to be performed by the information processing apparatus 100. Such operations include an operation of transmitting a document from the information processing apparatus 100 to the cloud system 210 and an operation of receiving operation results from the cloud system 210.

In step S1102, the information processing apparatus 100 determines whether it is update time. If it is update time, processing proceeds to step S1104; otherwise, the information processing apparatus 100 waits on standby until the update time. Specifically, the information processing apparatus 100 periodically acquires the operation status in the polling operation. In step S1104, the information processing apparatus 100 acquires the service status thereof.

In step S1106, the information processing apparatus 100 determines whether the service status has been acquired. If the service status has been acquired, processing proceeds to step S1108; otherwise, processing returns to step S1104.

In step S1108, the information processing apparatus 100 checks a change in the service status. If the service status remains unchanged from the previously acquired state, the information processing apparatus 100 is free from modifying the display form of the subfolder.

In step S1110, the information processing apparatus 100 determines whether the service status has changed. If the service status has changed, processing proceeds to step S1112; otherwise, processing returns to step S1102. In step S1112, a resource of the information processing apparatus 100 is acquired.

In step S1114, the information processing apparatus 100 modifies the icon thereof and returns to S1102. An icon indicating the service states acquired in step S1104 or the resource acquired in step S1112 is created and displayed in overlay on the subfolder associated with the service.

Figure 12A:
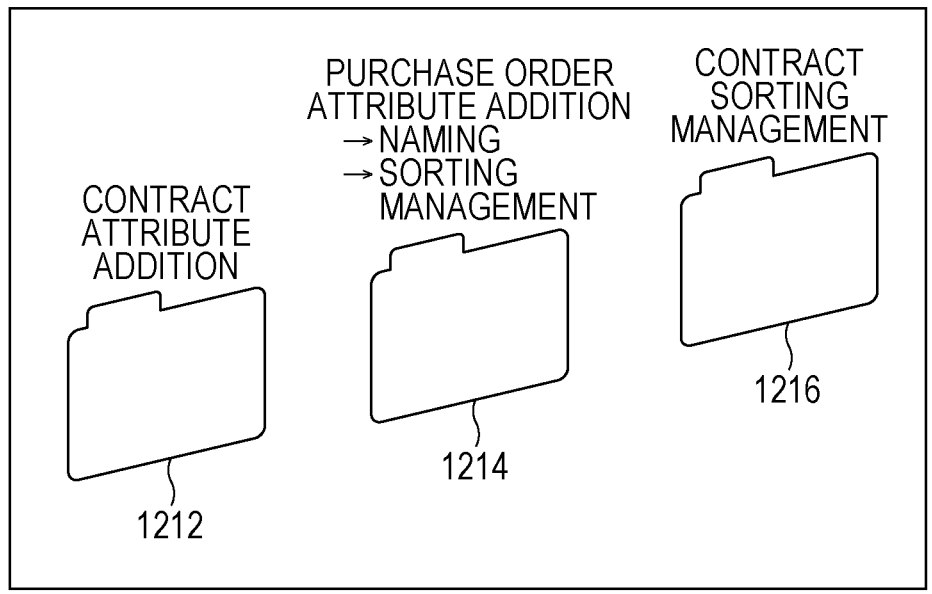
FIGS. 12A and 12B illustrate a process example of the exemplary embodiment.
Figure 12B:
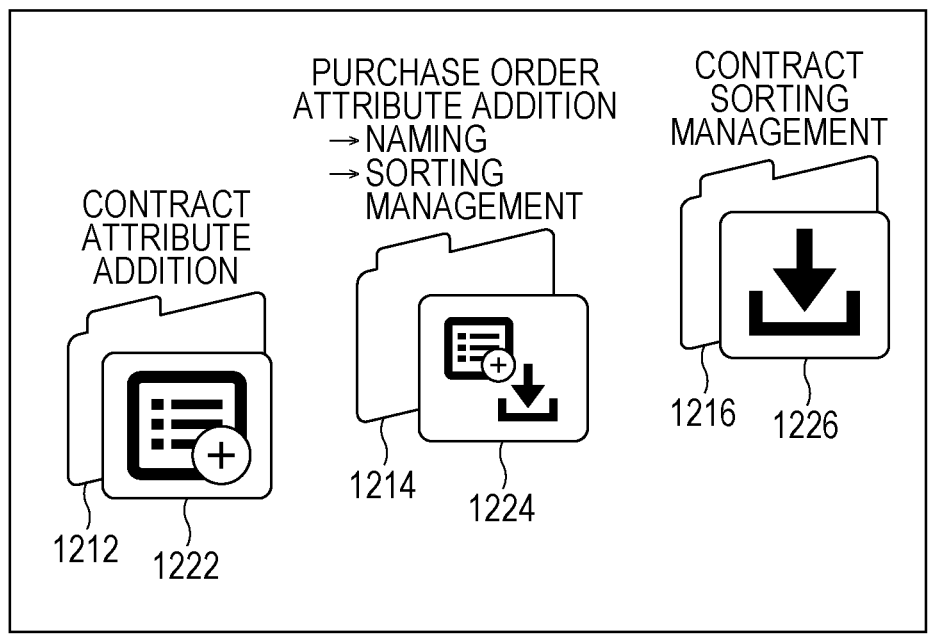

FIGS. 12A and 12B illustrate process examples of the exemplary embodiment. The name of the service of the cloud system 210 associated with the subfolder is simply displayed in the display form of the subfolder in FIG. 12A. For example, the service name "Contract attribute addition" is attached to an icon 1212 of the subfolder, the service name "Purchase order attribute addition→naming→sorting management" is attached to an icon 1214, and the service name "Contract sorting management" is attached to an icon 1216.

In the display form of the subfolder in FIG. 12B, icons indicating the types of services of the cloud system 210 associated with the subfolders are acquired from the cloud system 210 and displayed in overlay on the corresponding icons. For example, a service content icon 1222 indicating the type of the service "Contract attribute addition" is displayed in overlay on the icon 1212. A service content icon 1224 indicating the type of the service "Purchase order attribute addition→naming→sorting management" is displayed in overlay on the icon 1214. A service content icon 1226 indicating the type of the service "Contract sorting management" is displayed in overlay on the icon 1216.

Figure 13:
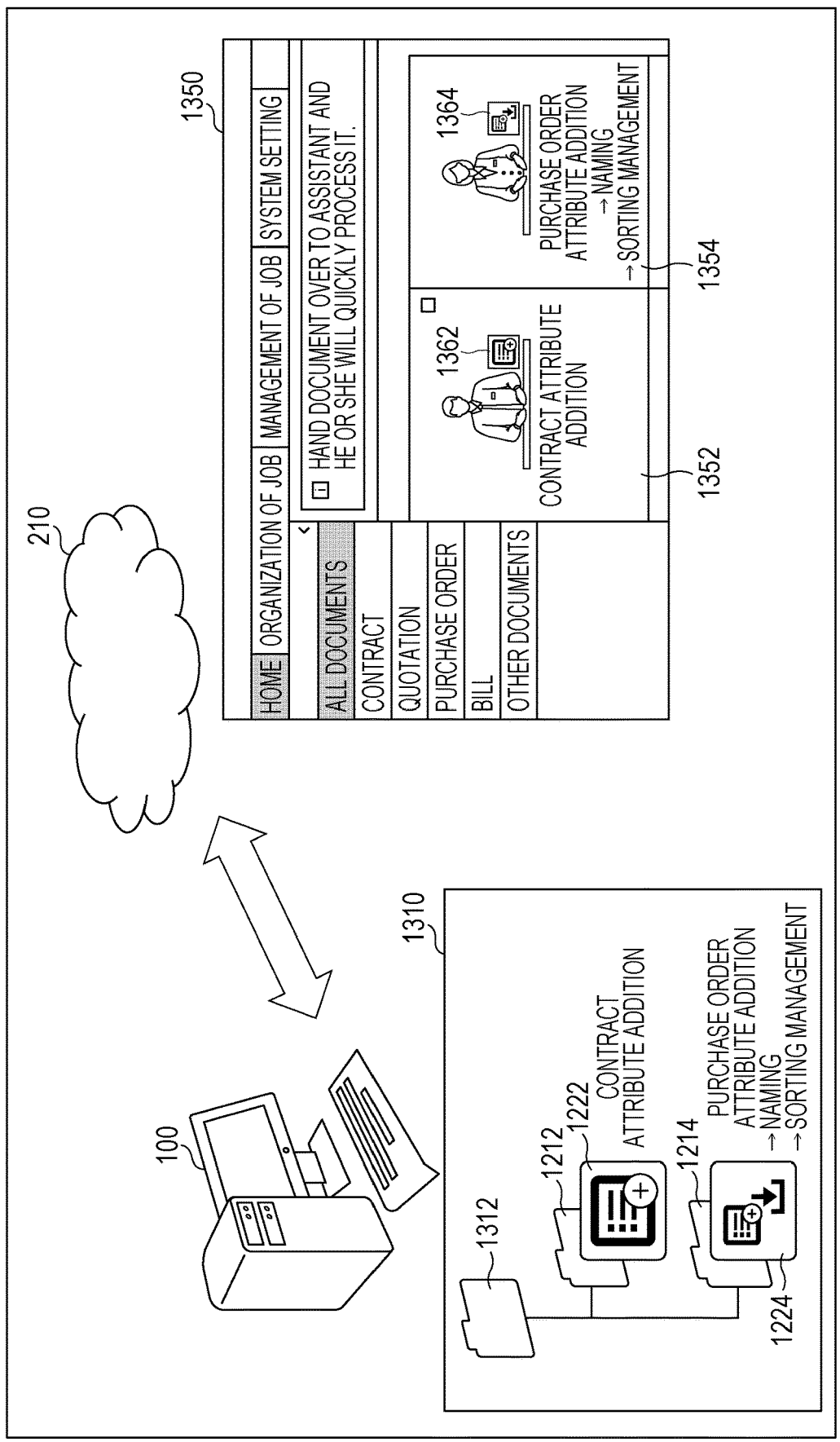
FIG. 13 illustrates a process example of the exemplary embodiment.

FIG. 13 illustrates a process example of the exemplary embodiment. If a service of the cloud system 210 is used not via the subfolder, specifically, if a browser of the information processing apparatus 100 accesses the cloud system 210, a cloud display screen 1350 is displayed on the browser. The cloud display screen 1350 displays a contract attribute addition service 1352 including a service mark 1362 and "Purchase order attribute addition→naming→sorting management" service 1354 including a service mark 1364.

When a subfolder is created, the information processing apparatus 100 acquires from the cloud system 210 service marks indicating the types of services associated with the subfolder (the service marks 1362 and 1364 in the example in FIG. 13). When subfolder is displayed, the information processing apparatus 100 displays the service mark as the service content icon (the service content icons 1222 and 1224 in FIG. 13) in overlay on the subfolder. Specifically, the service content icon 1222 is identical to the service mark 1362 and the service content icon 1224 is identical to the service mark 1364.

FIG. 14A through 14C illustrate a process example of the exemplary embodiment. Referring to FIGS. 14A and 14B, not only a service content icon but also an operation status icon is displayed in overlay on the icon of the subfolder. The operation status icons include the operation status of the cloud system 210 displayed in the flowchart in FIG. 10 and the operation status of the information processing apparatus 100 displayed in the flowchart in FIG. 11. Two operation status icons may not necessarily be used and alternatively, two statuses may be denoted within a single icon as illustrated in FIG. 14C.

Referring to FIG. 14A, a service content icon 1422 and an operation status icon 1432 on the side of the cloud system 210 are displayed in overlay on an icon 1412 indicating a subfolder. The service content icon 1422 is displayed frontward, the operation status icon 1432 on the side of the cloud system 210 is displayed rearward, and the contents of the operation status icon 1432 on the side of the cloud system 210 are not displayed.

If the operation status icon 1432 on the side of the cloud system 210 is selected through user operation, the operation status icon 1432 on the side of the cloud system 210 is displayed frontward and the service content icon 1422 is displayed rearward as illustrated in FIG. 14B1.

Referring to FIG. 14B, the operation status icon 1432 on the side of the cloud system 210 indicates that the cloud system 210 is not available. If a document is registered in the icon 1412 through user operation, a message display region 1442 indicating a message reading "Contract attribute addition service is not available" is displayed in addition to the example in FIG. 14B1 as illustrated in FIG. 14B2.

Referring to FIG. 14C, an operation status icon 1452 of the cloud system 210 and the information processing apparatus 100 is displayed in overlay on the icon 1412. The operation status icon 1452 of the cloud system 210 and the information processing apparatus 100 denotes on the right half side thereof the service status of the cloud system 210 and on the left half side thereof the service status of the information processing apparatus 100 on the client side. In this example, the cloud system 210 is suspended while the information processing apparatus 100 is in the standby state.

Information to be displayed in overlay on the subfolder may include (1) a service type of the cloud system 210 in association, (2) suspension or active status of the cloud system 210 or the information processing apparatus 100, (3) error state, (4) idling state, (5) in-progress state (with the number of waiting jobs), (6) waiting state for processing (such as user waiting for processing), (7) service being transferred from the subfolder to the cloud system 210, and (8) waiting state in subfolder.

The display form may be denoted by (1) an icon indicating state, (2) a color indicating the state, (3) a symbol such as x, !, or the like indicating the state notification, or (4) flashing indicating the state notification.

The program described above may be provided in the recorded form on a recording medium or by a communication medium. The program described above may be construed as a computer readable non-transitory recording medium storing the program.

The computer readable non-transitory recording medium refers to as a recording medium that is used to install, execute, and/or distribute the program.

The recording media include digital versatile disk (DVD), compact disk (CD), Blu-ray disc (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transfer medium. The transfer media include a wired network, a wireless network, or a combination thereof. The wired and wireless networks may include a local-area network (LAN), metropolitan-area network (MAN), wide-area network (WAN), the Internet, intranet, and extranet. The program in whole or in part may be transmitted over a carrier wave.

The program may be part of another program, or may be stored on the recording medium together with another program. The program may be split and the split programs may then be separately stored on the recording media. The program may be processed in any fashion before being stored as long as the program remains restorable. For example, the program may be compressed or encrypted before storage.

In the exemplary embodiment above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   at least one processor configured to:
   create, under a first folder associated with a cloud system used by the information processing apparatus, a second folder set to perform operations provided by the cloud system;
   perform control to perform the operations provided by the cloud system set in the second folder if a document is registered in the second folder;
   control a display to display an image, indicating a status of an operation provided the cloud system associated with the second folder, in overlay on the second folder; and
   control the display to display an indication indicating that the document cannot be registered in the second folder if the operation provided by the cloud system associated with the second folder is not available.

2. The information processing apparatus according to claim 1, wherein if a device that is available to the information processing apparatus is connected to the information processing apparatus, the at least one processor is configured to create the second folder that is set to perform an operation relating to the device from among the operations provided by the cloud system.

3. The information processing apparatus according to claim 2, wherein the at least one processor is configured to create the second folder that is set to perform an operation relating to a document that the device is enabled to output, from among the operations provided by the cloud system.

4. The information processing apparatus according to claim 1, wherein the at least one processor is configured to create the second folder when the first folder is specified.

5. An information processing apparatus comprising
at least one processor configured to:
   create, under a first folder associated with a cloud system used by the information processing apparatus, a second folder set to perform operations provided by the cloud system;
   perform control to perform the operations provided by the cloud system set in the second folder if a document is registered in the second folder; and
   control a display to display an image, indicating a status of an operation provided by the cloud system associated with the second folder and a status of the operation performed by the information processing apparatus, in overlay on the second folder.

6. An information processing apparatus comprising:
at least one processor means for:
   creating, under a first folder associated with a cloud system used by the information processing apparatus, a second folder set to perform operations provided by the cloud system;
   performing control to perform the operations provided by the cloud system set in the second folder if a document is registered in the second folder;
   controlling a display to display an image, indicating a status of an operation provided the cloud system associated with the second folder, in overlay on the second folder; and
   controlling the display to display an indication indicating that the document cannot be registered in the second folder if the operation provided by the cloud system associated with the second folder is not available.

7. A non-transitory computer readable medium storing a program causing a computer to execute a process for processing information, the process comprising:
   creating, under a first folder associated with a cloud system used by an information processing apparatus, a second folder set to perform operations provided by the cloud system;
   performing control to perform the operations provided by the cloud system set in the second folder if a document is registered in the second folder;
   controlling a display to display an image, indicating a status of an operation provided the cloud system associated with the second folder, in overlay on the second folder; and
   controlling the display to display an indication indicating that the document cannot be registered in the second folder if the operation provided by the cloud system associated with the second folder is not available.

* * * * *